(12) United States Patent
Maldonado et al.

(10) Patent No.: US 7,907,619 B2
(45) Date of Patent: Mar. 15, 2011

(54) METHOD, SYSTEM AND PROGRAM PRODUCT FOR ADAPTING TO PROTOCOL CHANGES

(75) Inventors: Juan Maldonado, Morrisville, NC (US); Mark E. Nosewicz, Round Rock, TX (US); Timothy J. Smith, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 838 days.

(21) Appl. No.: 11/612,657

(22) Filed: Dec. 19, 2006

(65) Prior Publication Data

US 2008/0144651 A1 Jun. 19, 2008

(51) Int. Cl.
*H04L 12/28* (2006.01)
(52) U.S. Cl. .................... 370/395.5; 379/88.17
(58) Field of Classification Search .......... 370/395, 370/465, 474, 395.5; 379/88.17
See application file for complete search history.

(56) References Cited

U.S. PATENT DOCUMENTS

| | | | |
|---|---|---|---|
| 5,826,030 A | 10/1998 | Hebert | |
| 6,904,600 B1 | 6/2005 | James et al. | |
| 2002/0038340 A1 | 3/2002 | Whipple et al. | |
| 2005/0172053 A1 | 8/2005 | James et al. | |
| 2005/0223391 A1 | 10/2005 | McKinley et al. | |
| 2006/0161554 A1* | 7/2006 | Lucovsky et al. | 707/10 |
| 2006/0177023 A1* | 8/2006 | Vaghar et al. | 379/88.17 |
| 2006/0248047 A1* | 11/2006 | Grier et al. | 707/2 |
| 2007/0230453 A1* | 10/2007 | Giaretta et al. | 370/389 |

* cited by examiner

*Primary Examiner* — Dang T Ton
*Assistant Examiner* — Wei Zhao
(74) *Attorney, Agent, or Firm* — Yee & Associates, P.C.; Arthur J. Samodovitz (57) ABSTRACT

A method, system and program product for overriding existing functionality provided in an application programming interface (API) for a local protocol implementation is provided. The method includes providing an API for a local protocol implementation having a raw interface function that can be invoked by a client application to override existing functionality provided in the API. The method further includes defining for the raw interface function an array of pre-formed payload elements to be included for creating a customized protocol request message for requesting a protocol service from a server application using a remote protocol implementation different than the local protocol implementation, populating data for each element in the array defined, and invoking the raw interface function, which takes as input the array defined and inserts them, in order, behind a protocol message header of the protocol request message and sends the customized protocol request message to the server application.

20 Claims, 4 Drawing Sheets

METHOD, SYSTEM AND PROGRAM PRODUCT FOR ADAPTING TO PROTOCOL CHANGES

FIELD OF THE INVENTION

The present invention relates to a method, system and computer program product for adapting to changes in an evolving standards-based protocol implementation. In particular, the present invention relates to a method, system and computer program product for overriding existing functionality provided in an application programming interface for a local protocol implementation in order to interoperate with applications that use a remote protocol implementation that provides different functionality than the local protocol implementation.

BACKGROUND OF THE INVENTION

When a back-end specification change is made to an evolving protocol in a multi-media environment, it means that the server code that implements the application programming interface (API) has to be changed to offer any new functions made available in the back-end. However, trying to anticipate the functions and usage of the API by a client application is impossible when the protocol is changing constantly. A new release would have to be provided on a frequent basis in order for a client to take advantage of the new functions, or else the client would be unable to take advantage of the new functions. As such, there is a need to provide a cost-effective and efficient way to make changes to an API when the back-end specification changes, without having to issue new and comprehensive releases too frequently and to enable clients to take advantage of any new functions that have been added. Also, there is a need to provide a mechanism for overcoming any incompatibility issues with another vendor's equipment that interprets an evolving protocol.

SUMMARY OF THE INVENTION

In a first aspect of the invention, there is provided a method of overriding existing functionality provided in an application programming interface for a local protocol implementation. The method includes providing an application programming interface for a local protocol implementation implementing a protocol, the application programming interface having a raw interface function that can be invoked by a client application to override existing functionality provided in the application programming interface in order to interoperate with a remote protocol implementation implementing the protocol, the remote protocol implementation supporting different functionality than the local protocol implementation. The method further includes defining for the raw interface function an array of pre-formed payload elements to be included for creating a customized protocol request message for requesting a protocol service from a server application using the remote protocol implementation and populating data for each element in the array of pre-formed payload elements defined for creating the customized protocol request message. Further, the method includes invoking the raw interface function to override the existing functionality, where the raw interface function takes as input the array of pre-formed and pre-populated payload elements defined and creates the customized protocol request message by inserting the array of pre-formed payload elements in order behind a protocol message header of the protocol request message and sends the customized protocol request message to the remote protocol implementation. The method further includes returning to the client application a protocol response message from the server application, the protocol response message containing payload data formatted as another array of pre-formed payload elements. In an embodiment, the application programming interface provided for the local protocol implementation has one or more pre-defined protocol functions that can be invoked by the client application for sending a standard protocol request message requesting the protocol service. The method further includes invoking a pre-defined protocol function of the one or more pre-defined protocol functions, the pre-defined protocol function having a list of pre-defined parameters to be passed to the pre-defined protocol function invoked for creating the standard protocol request message. In an embodiment, the invoking a pre-defined protocol function step further includes loading data corresponding to the list of pre-defined parameters into pre-defined payload elements of the standard protocol request message, the pre-defined payload elements corresponding to the list of pre-defined parameters passed to the pre-defined protocol function. In an embodiment, each element in the array of pre-formed payload elements created includes at least one of: a TLV (Type, Length, Value), an AVP (Attribute Value Pair) and a delimited text string. In an embodiment, the protocol includes any protocol that uses discrete payload elements. In an embodiment, the protocol includes a Diameter protocol.

In another aspect of the invention, there is provided a system for modifying existing protocol functionality provided in an application programming interface for a client-side protocol implementation. The system includes a server-side remote protocol implementation implementing a protocol configured to provide a protocol service in response to a protocol request message that is received, and a client-side protocol implementation implementing the protocol having an application programming interface, the application programming interface having a raw interface function configured to override existing protocol functionality provided in the application programming interface, where a client application using the client-side protocol implementation defines for the raw interface function an array of pre-formed payload elements to be included for creating a customized protocol request message for requesting a protocol service from a server-side application using the server-side remote protocol implementation, with the server-side remote protocol implementation supporting different functionality than the client-side protocol implementation. In an embodiment, the client application populates data for each element in the array of preformed payload elements defined and the client application invokes the raw interface function to modify existing protocol functionality provided in the application programming interface of the client-side protocol implementation. In an embodiment, the raw interface function is further configured to take as input the array of pre-formed and pre-populated payload elements defined and to create the customized protocol request message by inserting the array of pre-formed payload elements in order behind a protocol message header of the customized protocol request message and to send the customized protocol request message to the server-side application using the server-side remote protocol implementation. In an embodiment, the client-side protocol implementation having the application programming interface is configured to receive a function call invoking a pre-defined protocol function provided in the application programming interface for sending a standard protocol request message to the server-side application requesting the protocol service, and where the server-side remote protocol implementation is configured to return to the client application a protocol response message containing payload data formatted as another array of pre-formed payload elements. In an embodiment, the application programming interface is further configured to load data corresponding to a list of pre-defined parameters into pre-defined payload elements of the standard protocol request message, the pre-defined payload elements corresponding to the list of pre-defined parameters passed to the pre-defined protocol function. In an embodiment, each element in the array of pre-formed payload elements created includes at least one of: a TLV (Type, Length, Value), an AVP (Attribute Value Pair) and a delimited text string. In an embodiment, the protocol includes any protocol that uses discrete payload elements.

In yet another aspect of the invention, there is provided a computer program product for modifying functionality provided in an application programming interface for a local protocol X implementation. The computer program product includes a computer readable medium, first program instructions to provide an application programming interface for a local protocol X implementation implementing a protocol X, the application programming interface having a raw interface function that can be invoked by a client application to override existing functionality provided in the application programming interface in order to interoperate with a remote protocol X implementation implementing the protocol X, the remote protocol X implementation supporting different functionality than the local protocol X implementation. In an embodiment, the first program instructions further include instructions to provide the application programming interface for the local protocol X implementation having one or more pre-defined protocol X functions that can be invoked by the client application for sending a standard protocol X request message requesting the protocol X service, and to invoke a pre-defined protocol X function of the one or more pre-defined protocol X functions provided, the pre-defined protocol X function having a list of pre-defined parameters to be passed to the pre-defined protocol X function invoked for creating the standard protocol X request message. In an embodiment, the first program instructions further include instructions to load data corresponding to the list of pre-defined parameters into pre-defined payload elements of the standard protocol X request message, the pre-defined payload elements corresponding to the list of pre-defined parameters passed to the pre-defined protocol X function. The computer program product further includes second program instructions to define for the raw interface function an array of pre-formed payload elements to be included for creating a customized protocol X request message for requesting a protocol X service from a server application using the remote protocol X implementation, the second instructions including instructions to populate data for each element in the array of pre-formed payload elements defined. Furthermore, the computer program product includes third program instructions to invoke the raw interface function, where the raw interface function takes as input the array of pre-formed and pre-populated payload elements defined and creates the customized protocol X request message by inserting the array of pre-formed payload elements in order behind a protocol X message header of the protocol X request message and sends the customized protocol X request message to the remote protocol X implementation. The computer program product further includes fourth program instructions to return to the client application a protocol X response message from the server application, the protocol X response message containing payload data formatted as another array of pre-formed payload elements, the fourth program instructions being stored on the computer readable medium. In an embodiment, each element in the array of pre-formed payload elements created includes at least one of: a TLV (Type, Length, Value), an AVP (Attribute Value Pair) and a delimited text string. In an embodiment, the protocol X includes any protocol that uses discrete payload elements. Preferably, each of the first, second, third and fourth program instructions are stored on the computer readable medium.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents. Reference will now be made in detail to the preferred embodiments of the invention.

Figure 1:
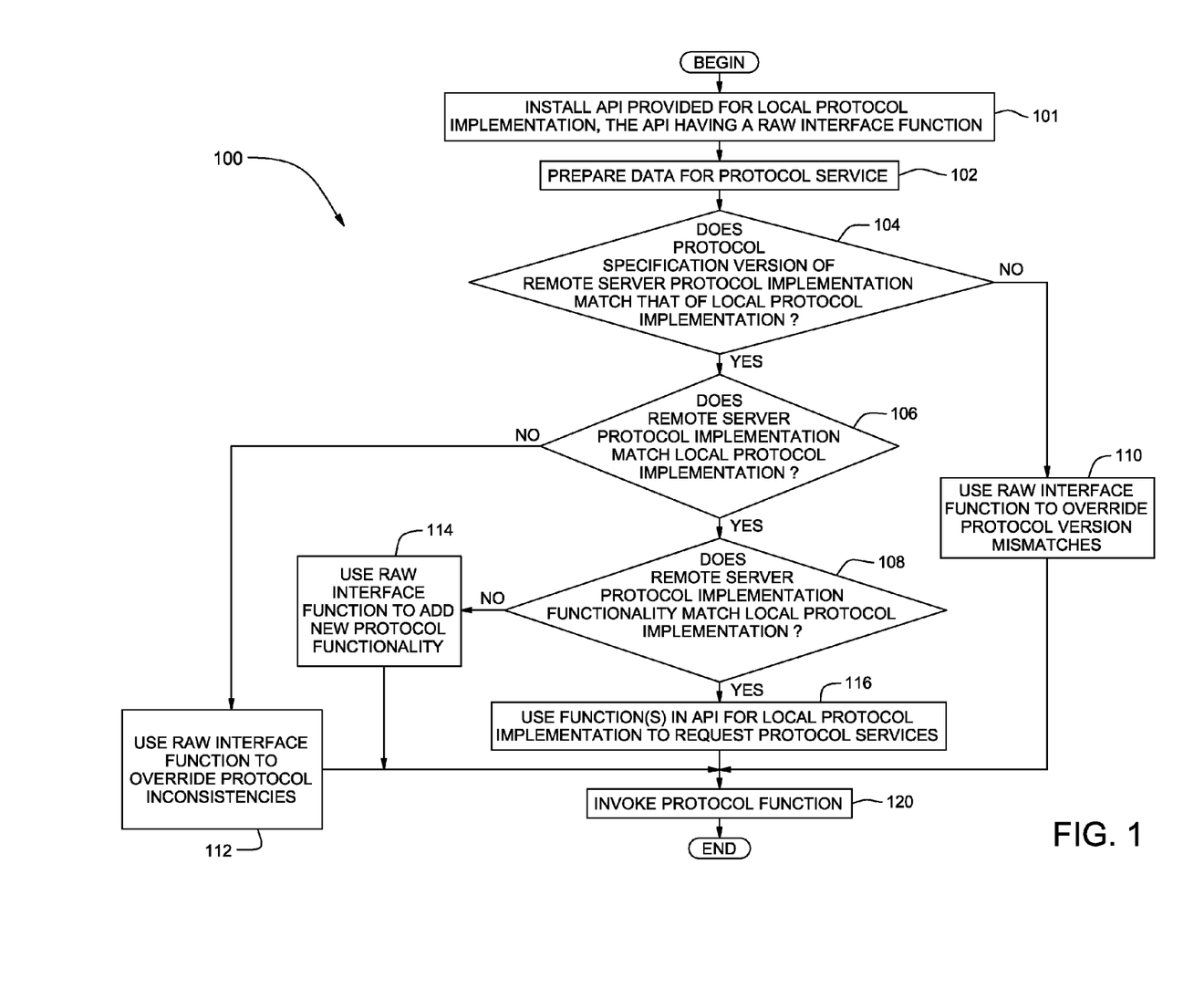
FIG. 1 depicts a flowchart for overriding or modifying functionality provided in an application programming interface (API) for a protocol X implementation, in accordance with an embodiment of the present invention.
Figure 2:
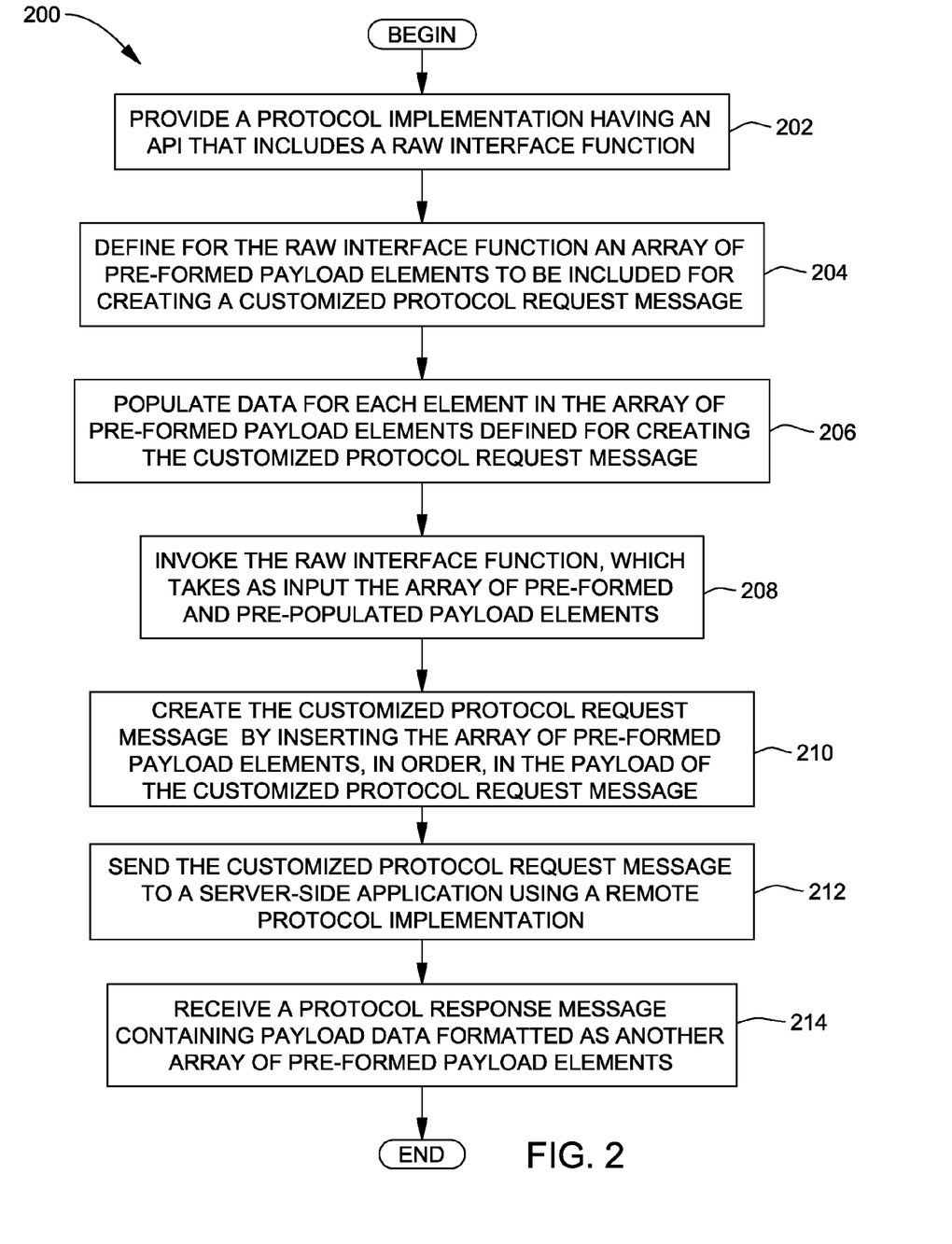
FIG. 2 depicts a flowchart for overriding or modifying functionality provided in an application programming interface (API) for a protocol X implementation, in accordance with an embodiment of the present invention.

In one embodiment, the invention provides a method of overriding or modifying existing functionality provided in an application programming interface (API) for a protocol implementation (also, referred to herein as local protocol implementation, local protocol X implementation or protocol X implementation), where the protocol or protocol X implemented is any standards-based protocol or protocol specification. The functional content of the protocol is abstracted into the API. The API for the protocol implementation is implemented as a set of internal classes (collection of parameters or variables) and methods or functions that can be invoked by a calling application or a client-side application or client application for creating a packet or message format and content, as explained herein below with respect to FIGS. 3A and 3B. The protocol implementation exports an API so that other client applications or calling applications can use the protocol implementation. Reference is now made to FIGS. 1 and 2, which illustrate various aspects of a method of overriding or modifying existing functionality provided in an application programming interface for a protocol implementation. Turning to FIG. 1, reference numeral 100 outlines a method or process carried out by an end user, for instance, a programmer for a client application or a client application client-side application or calling application that utilizes in step 101 an application programming interface provided for a local protocol implementation for accessing or calling one or more applications, namely, server-side applications that provide a service to a request, where the application programming interface has a raw interface function. In particular, the client application calls a server application or server-side application to request protocol services, where the server-side or server application utilizes a remote server protocol implementation (also refereed to herein as remote protocol X implementation, remote protocol implementation or remote server protocol implementation) that is installed on a server, either a remote server or a local server. As used herein, "protocol implementation" or "local protocol implementation" or "protocol X implementation" refers to the use of the protocol implementation implemented by the calling or client or client-side application, whereas, "remote protocol implementation" or "remote server protocol implementation" or "remote protocol X implementation" refers to the protocol implementation implemented by a server or server-side application, such as, another party or service vendor (server-side application) that is providing a protocol service, where the term "remote" simply means a separate program or process which can be on the same machine or a different machine. Since there may be differences between the local protocol implementation being used by the calling application and the remote server protocol implementation (or remote protocol implementation) that is used by a server application (or server-side application), this could lead to errors in invoking a protocol function due to inconsistency or incompatibility issues. Accordingly, the flowchart 100 outlines the steps for overriding any such inconsistencies or incompatibilities posed by a remote protocol implementation that is used by a server or server-side application to provide protocol services to a client application utilizing a local protocol implementation. The process begins with step 102 with preparing data to be sent by the client application or calling application for requesting a protocol service. In particular, the client application makes a request (via an API call) and sends the data using the local protocol implementation installed on the client side. In step 104, a determination is made as to whether or not the protocol specification version used for the remote server protocol implementation matches the protocol specification version for the local protocol implementation of the protocol. For instance, the protocol specification version for the remote server protocol implementation may be 3.2, whereas, the protocol specification version for the local protocol implementation may be 3.1, where protocol specification version 3.2 is newer than 3.1. If the protocol specification version for the remote protocol implementation matches the protocol specification version for the local protocol implementation in step 104, then a determination is made in step 106 as to whether or not the remote server protocol implementation matches the local protocol implementation. In particular, a determination is made as to whether or not there is any inconsistencies in functionality, aside from the actual protocol functions that can be invoked by the calling application. The inconsistencies in functionality may be something minor, such as differing interpretations of the protocol specification requirements that makes the local and the remote protocol implementations incompatible. Or, it may be extensions beyond the protocol specification that are only implemented in the remote protocol implementation. Or, it may be errors in either the local or remote protocol implementations. If the protocol specification version for the remote server protocol implementation matches the protocol specification version for the local protocol implementation in step 106, a determination is made in step 108 as to whether or not the remote server protocol implementation has functionality that matches the functionality embodied by the API for the local protocol implementation. In step 108, if it is determined that the protocol functionality provided in the remote server protocol implementation matches the functionality embodied by the API for the local protocol implementation, then the client application or calling application uses in step 116 the protocol function or functions provided in the application programming interface (API) for the local protocol implementation to request protocol services and in step 120 invokes the protocol function or functions. In an embodiment, the API provided for the local protocol implementation has one or more pre-defined protocol functions in addition to the raw interface function that can be used by the client application in step 116 to invoke, in step 120, the one or more pre-defined protocol functions for sending a standard protocol request message requesting a protocol service. Further, each pre-defined protocol function has a list of pre-defined parameters to be passed to the pre-defined protocol function invoked for creating the standard protocol request message. As such, invoking a pre-defined protocol function, loads data (step 102) corresponding to the list of pre-defined parameters into pre-defined payload elements for creating the standard protocol request message.

The API for the protocol implementation is implemented as a set of internal classes and methods or functions that can be invoked by a calling application or a client-side application or client application. The API for a protocol implementation consists of a list of pre-defined protocol functions with parameters that will be invoked by a calling application via a function or API call. These pre-defined protocol functions are designed to create the packet or message format and content based on the protocol specification. Each pre-defined protocol function translates into one or more packets or messages (based on protocol specification) that carry the pre-defined parameter information as part of their payload (body portion of a packet). When one of the pre-defined functions or methods of the API is invoked or called by a calling application, the code is executed and the data are passed as parameters to the pre-defined function or method called. The pre-defined parameters are used to build up the payload elements (elements that make up the payload or body portion) of a standard protocol message or packet, where each payload element carries the actual value or data. The standard protocol message or packet is constructed and sent to the receiving or remote protocol implementation. Thus, when invoking a pre-defined function provided in the API for the protocol implementation, the payload is formatted such that the value of parameter 1 is put into the value area of payload element 1, the value of parameter 2 is put into the value area of payload element 2, etc., as described further with respect to FIG. 3B. Accordingly, when a calling application invokes a pre-defined function in the API, the calling application passes data across that API and that data is plugged into the payload elements corresponding to the pre-defined parameters to create the standard protocol message that is sent to the remote or receiving protocol implementation on a server that provides a protocol service.

However, going back to step 104, if a determination is made that the protocol specification version for the remote server protocol implementation does not match the protocol specification version for the local protocol implementation of the protocol, then in step 110, a raw interface function or method provided in the application programming interface (API) for the local protocol implementation is used to override any version mismatches between the local protocol implementation and the remote server protocol implementation. Further, going back to step 106, if a determination is made that there are inconsistencies in functionality (other than the protocol functions) between the remote server protocol implementation and the local protocol implementation, then in step 112, a raw interface function or method provided in the application programming interface for the local protocol implementation is used to override any inconsistencies between the local protocol implementation and the remote server protocol implementation. Further, going back to step 108, if a determination is made that the protocol functionality provided by the remote server protocol implementation does not match the functionality embodied by the API for the local protocol implementation, for instance, new functions have been added to the remote protocol implementation, then in step 112, a raw interface function or method provided in the application programming interface for the local protocol implementation is used in step 114 to override or modify or to add new protocol functionality, that can be invoked by the client application in step 120 for sending a customized protocol request message, that is, a request message that is designed or created for the client application, requesting a protocol service, as described further herein below in FIG. 2, ending the process.

Turning to FIG. 2, reference numeral 200 outlines a method of overriding or modifying existing functionality provided in an application programming interface (API) for a protocol implementation, for instance, in step 114 in FIG. 1) in order to request a protocol service provided by a server-side application using a remote protocol implementation. As shown in FIG. 2, the method of overriding or modifying existing functionality provided in the API starts with providing, in step 202, a protocol implementation having an API that includes a raw interface function that can be invoked by a client or calling application to override existing functionality provided in the API in order to interoperate with the remote protocol implementation, the remote protocol implementation supporting different functionality than the local protocol implementation. The method further comprises defining, in step 204, for the raw interface function an array of pre-formed payload elements to be included for creating a customized protocol request message for requesting a protocol service from a server-side application using the remote protocol implementation. Further, the method comprises populating, in step 206, data for each element in the array of pre-formed payload elements defined for creating the customized protocol request message, as will be described herein below with respect to FIG. 3B. Further, the method includes invoking, in step 208, the raw interface function, which takes as input the array of pre-formed and pre-populated payload elements defined and creating, in step 210, the customized protocol request message by inserting the array of pre-formed payload elements in order behind a protocol message header of the protocol request message. Further, the method comprises sending, in step 212, the customized protocol request message to the server-side application using the remote protocol implementation. The method further includes receiving, in step 214, a protocol response message from the server-side application, the protocol response message containing payload data formatted as another array of pre-formed payload elements, ending the process. In an embodiment, each element in the array of pre-formed payload elements created includes any one of the following types: a TLV (Type, Length, Value), an AVP (Attribute Value Pair) and a delimited text string. In an embodiment, the protocol comprises any protocol that uses discrete payload elements. In an embodiment, the protocol or protocol X comprises a Diameter protocol that is configured to provide the protocol services of authentication, authorization and accounting to a calling or client application. However, the method may be used with other protocols that use discrete payload elements to provide other protocol services.

Accordingly, when a protocol specification is changed to add new functionality, for instance, additional payload elements are added, typically, the remote protocol implementation is upgraded to support the new payload elements. In particular, new or different payload elements required for the new functionality are inspected and acted upon by the remote protocol X implementation. As such, the calling application using the API for the local protocol implementation would not be able to make use of the new functionality without the raw interface function provided by the API protocol implementation. However, with the raw interface function, if a calling application wants to take advantage of the new functionality, a programmer for the calling application can go ahead and override the existing functionality provided in the API, as described herein above with respect to FIG. 2 and is further described herein below with respect to FIG. 3B.

Figure 3A:
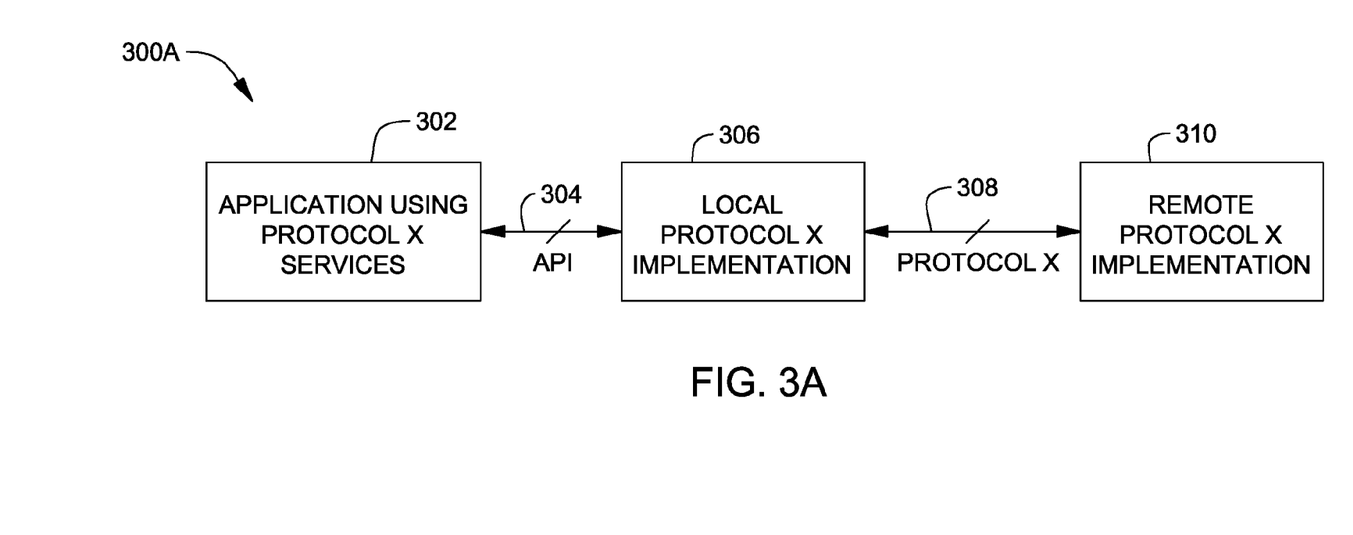
FIG. 3A is a schematic block system diagram illustrating a client application using an application programming interface (API) provided for a local protocol X implementation for accessing protocol X services that use a remote protocol X implementation, where the local protocol X implementation and the remote protocol X implementation communicate using the protocol X, in accordance with an embodiment of the present invention.
Figure 3B:
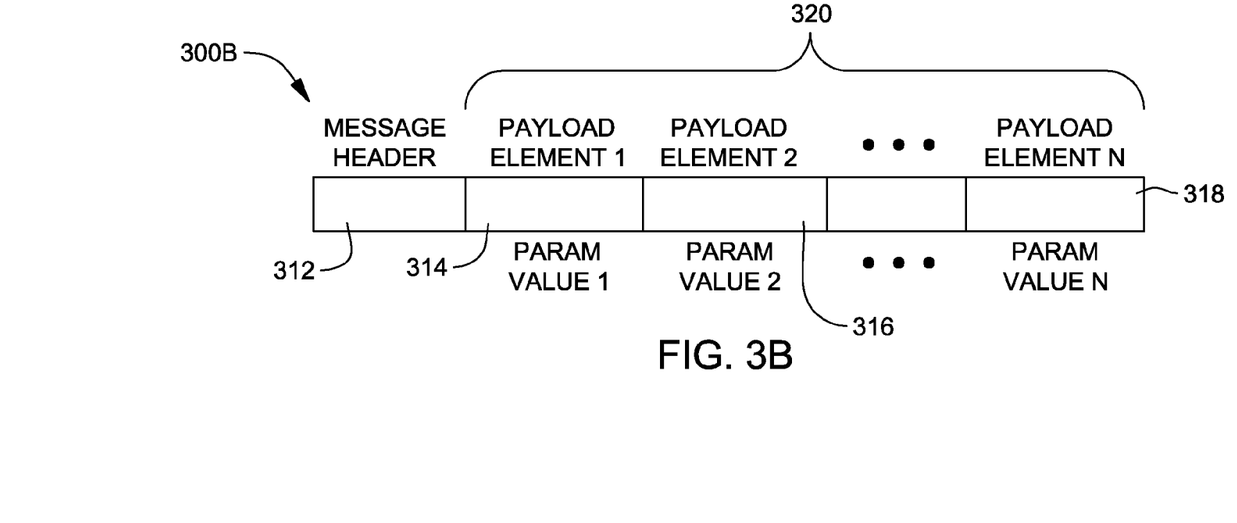
FIG. 3B is a schematic block system diagram illustrating the creation of a protocol message invoking a function provided in the application programming interface for protocol X implementation, in accordance with an embodiment of the present invention.

In another embodiment, as shown in FIGS. 3A and 3B, the invention provides a system 300A for modifying existing protocol functionality provided in an application programming interface (API) for a protocol implementation or a protocol X implementation (or local protocol or protocol X implementation), where protocol or protocol X comprises any protocol that uses discrete payload or data elements. The system comprises a remote protocol X implementation 310 (also referred to as a server-side remote protocol X implementation) configured to provide a protocol service (represented by double-sided arrow 308) in response to a protocol X request message (described herein below with respect to FIG. 3B) that is received from a client or calling application 302. Further, the system 300A comprises a local protocol X implementation 306 (also referred to as a client-side protocol or protocol X implementation) that provides an application programming interface (represented by double-sided arrow 304) which has a raw interface function that is configured to override existing protocol functionality provided in the application programming interface 304. So if, for instance, the remote protocol X implementation 310 supports different functionality, for instance, offers newer functions, than the local protocol X implementation 306, then the raw interface function provided in the API 304 can be used by a programmer on the client-side to modify the existing functions and/or to create new functions that can be invoked by the calling application 302. In particular, a client or calling application 302, using the local protocol X implementation 306 to request a protocol service 308, defines for the raw interface function an array of pre-formed payload elements to be included for creating a customized protocol request message for requesting the protocol service 308 from a server-side application using the remote protocol X implementation or server-side remote protocol implementation 310. In an embodiment, the client or calling application 302 populates data for each element in the array of preformed payload elements defined and the client application 302 invokes the raw interface function to modify existing protocol functionality provided in the application programming interface 304 of the local protocol X implementation or client-side protocol implementation 306. In an embodiment, the raw interface function is further configured to take as input the array of pre-formed and pre-populated payload elements defined and to create the customized protocol request message 300B by inserting the array of pre-formed payload elements in order behind a protocol message header 312 (in the payload section 320 in FIG. 3B) of the customized protocol request message and to send the customized protocol request message to the server-side application using the server-side remote protocol implementation or remote protocol X implementation 310.

In an embodiment, the client-side protocol implementation or local protocol X implementation 306 providing the application programming interface 304 is configured to receive a function call or API call invoking a pre-defined protocol function provided in the application programming interface for sending a standard protocol request message to the server-side application requesting a protocol X service. All of the key information needed to perform the function must be included in that function or API call. Further, the server-side remote protocol implementation or remote protocol X implementation 310 is configured to return to the client application 302 a protocol response message 308 containing payload data formatted as another array of pre-formed payload elements. In an embodiment, the application programming interface 304 is further configured to load data corresponding to a list of pre-defined parameters into pre-defined payload elements of the standard protocol request message, where the pre-defined payload elements correspond to the list of pre-defined parameters being passed to the pre-defined protocol function. In an embodiment, each element in the array of pre-formed payload elements created includes at least one of: a TLV (Type, Length, Value), an AVP (Attribute Value Pair) and a delimited text string. In an embodiment, the protocol X includes any protocol that uses discrete payload elements. In an embodiment, the protocol or protocol X comprises a Diameter protocol that is configured to provide the protocol services of authentication, authorization and accounting to a calling or client application.

Turning to FIG. 3B, reference numeral 300B, depicts a protocol packet or message that is created when a function that is provided in the API for the protocol implementation is invoked. For example, a calling application uses a pre-defined function called getUserCredit in the API, where the pre-defined getUserCredit function has two pre-defined parameters, User-Name and User-Realm. As such, when the getUserCredit function of the API implementation is invoked by a calling application, the getUserCredit function creates a protocol request packet or message that has a payload format consisting of two payload elements, namely, a User-Name element and a User-Realm element. In particular, the getUser-Credit function takes the value or data (Joe) for the pre-defined parameter User-Name and puts it into the pre-defined payload element User-Name of the payload and takes the value or data (realm_xyz.com) for the pre-defined parameter User-Realm and puts it into the pre-defined element User-Realm, which message is then sent to the remote protocol implementation on a server. The remote protocol implementation receives the message and the results or response data (for instance, $10) are returned as an element (for example, in an Account-Value element) in the payload of a response packet from the server application to the calling application. As shown in FIG. 3B, a protocol request or message 300B contains a message header portion 312, and a payload portion 320 that includes one or more pre-defined payload elements 1, 2 through N, reference numerals 314, 316 through 318, respectively, depending on how many parameters are defined for a given function. In the example herein above, since the function getUserCredit has two parameters, the message that is created would have two pre-defined payload elements, User-Name element and User-Realm element, and, as such, the value or data corresponding to the User-Name parameter would be inserted into the payload element 1, reference numeral 314, of the payload portion 320. Similarly, the value or data for the User-Realm parameter would be inserted into the payload element 2, reference numeral 316, of the payload portion 320. Further, if the remote protocol implementation has been changed, for instance, the getUserCredit function now includes an additional payload element, Account-ID element, that is, the getUserCredit function now has three parameters, User-Name, User-Realm and Account-ID then the remote protocol implementation is expecting a packet or message format with a payload or data format that corresponds to the three elements, namely, User-Name element, User-Realm element and Account-ID element, but would instead only receive a packet with data corresponding to the User-Name element and the User-Realm element. As such, a calling application using the API for the protocol implementation (without the raw interface function) would not be able to communicate with the server application. However, with an API having the raw interface function, a programmer can override or modify the existing getUserCredit function in the local protocol implementation to send a customized request, but would need to know that an additional parameter has been added to the function getUserCredit in the remote protocol implementation and that the format for the protocol packet that the remote protocol implementation is expecting data corresponding to the three payload elements, namely, the User-Name element, the User-Realm element and the Account-ID element. Accordingly, if a calling application wants to invoke the getUserCredit now having the Account-ID element, the programmer needs to create the User-Name element (Joe), the User-Realm element (realm_xyz.com), and the Account-ID element (00123) and needs to insert the corresponding data (Joe, realm_xyz.com and 00123, respectively) in order to pre-populate each of the elements created. Further, the programmer also needs to know the exact format (for instance, a TLV, an AVP format or a delimited text string, etc.) of each payload element in the protocol message that is expected by the remote protocol implementation. Accordingly, the programmer would define an array of these three pre-formed payload or data elements that will be used to create the payload 320 (in FIG. 3B) of the customized protocol request message. For instance, if the format for the elements in the remote protocol implementation uses a TLV (Type, length, Value) format, then the programmer would define, before invoking the raw interface function, a variable length array of pre-formed payload elements, as follows: [User-Name, length, "Joe"] [User-Realm, length, "realm_xyz.com"] [Account-ID, length, "00123"]. As such, there is a pre-existing or pre-formed match between an element (User-Name) and the data or value (Joe) that is passed to the raw interface function when invoked by the calling application. In particular, the array of pre-formed payload elements would be passed to the function rawProtocolXRequest instead of the function getUserCredit, such that, the array of pre-formed payload elements are inserted in the payload of the customized protocol request message that is sent to the remote protocol implementation. So with an API having a raw interface function, the application developer is not only providing the data to be passed to the function, but is also defining the elements that make up the packet format.

In yet another embodiment, the invention provides a computer program product for modifying or overriding functionality provided in an application programming interface for a protocol X implementation. Preferably, the computer program product is in a form accessible from the computer-usable or computer-readable medium, which provides program codes or instructions for use by or in connection with a computer or any instruction execution system. For the purposes of this description, a computer-usable or computer-readable medium can be any apparatus that can store the codes or instructions for use by or in connection with the instruction execution system, apparatus, or device. Preferably, the computer-readable medium can include a semiconductor or solid state memory, magnetic tape, a removable computer diskette, a random access memory (RAM), a read-only memory (ROM), a rigid magnetic disk and an optical disk. Further, examples of optical disks include compact disc-read only memory (CDROM), compact disc-read/write (CD-R/W) and digital versatile/video disc (DVD). The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The computer program product further comprises first program instructions to provide an application programming interface for a local protocol X implementation implementing a protocol X, the application programming interface having a raw interface function that can be invoked by a client application to override existing functionality provided in the application programming interface in order to interoperate with a remote protocol X implementation implementing the protocol X, the remote protocol X implementation supporting different functionality than the local protocol X implementation. In an embodiment, the first program instructions further include instructions to provide the application programming interface for the local protocol X implementation having one or more pre-defined protocol X functions that can be invoked by the client application for sending a standard protocol X request message requesting the protocol X service, and to invoke a pre-defined protocol X function of the one or more pre-defined protocol X functions provided, the pre-defined protocol X function having a list of pre-defined parameters to be passed to the pre-defined protocol X function invoked for creating the standard protocol X request message. In an embodiment, the first program instructions further include instructions to load data corresponding to the list of pre-defined parameters into pre-defined payload elements of the standard protocol X request message, the pre-defined payload elements corresponding to the list of pre-defined parameters passed to the pre-defined protocol X function. The computer program product further includes second program instructions to define for the raw interface function an array of pre-formed payload elements to be included for creating a customized protocol X request message for requesting a protocol X service from a server application using the remote protocol X implementation, the second instructions including instructions to populate data for each element in the array of pre-formed payload elements defined. Furthermore, the computer program product includes third program instructions to invoke the raw interface function, where the raw interface function takes as input the array of pre-formed and pre-populated payload elements defined and creates the customized protocol X request message by inserting the array of pre-formed payload elements in order behind a protocol X message header of the protocol X request message and sends the customized protocol X request message to the remote protocol X implementation. The computer program product further includes fourth program instructions to return to the client application a protocol X response message from the server application, the protocol X response message containing payload data formatted as another array of pre-formed payload elements, the fourth program instructions being stored on the computer readable medium. In an embodiment, each element in the array of pre-formed payload elements created includes at least one of: a TLV (Type, Length, Value), an AVP (Attribute Value Pair) and a delimited text string. In an embodiment, the protocol X includes any protocol that uses discrete payload elements. Preferably, each of the first, second, third and fourth program instructions are stored on the computer readable medium.

Figure 4:
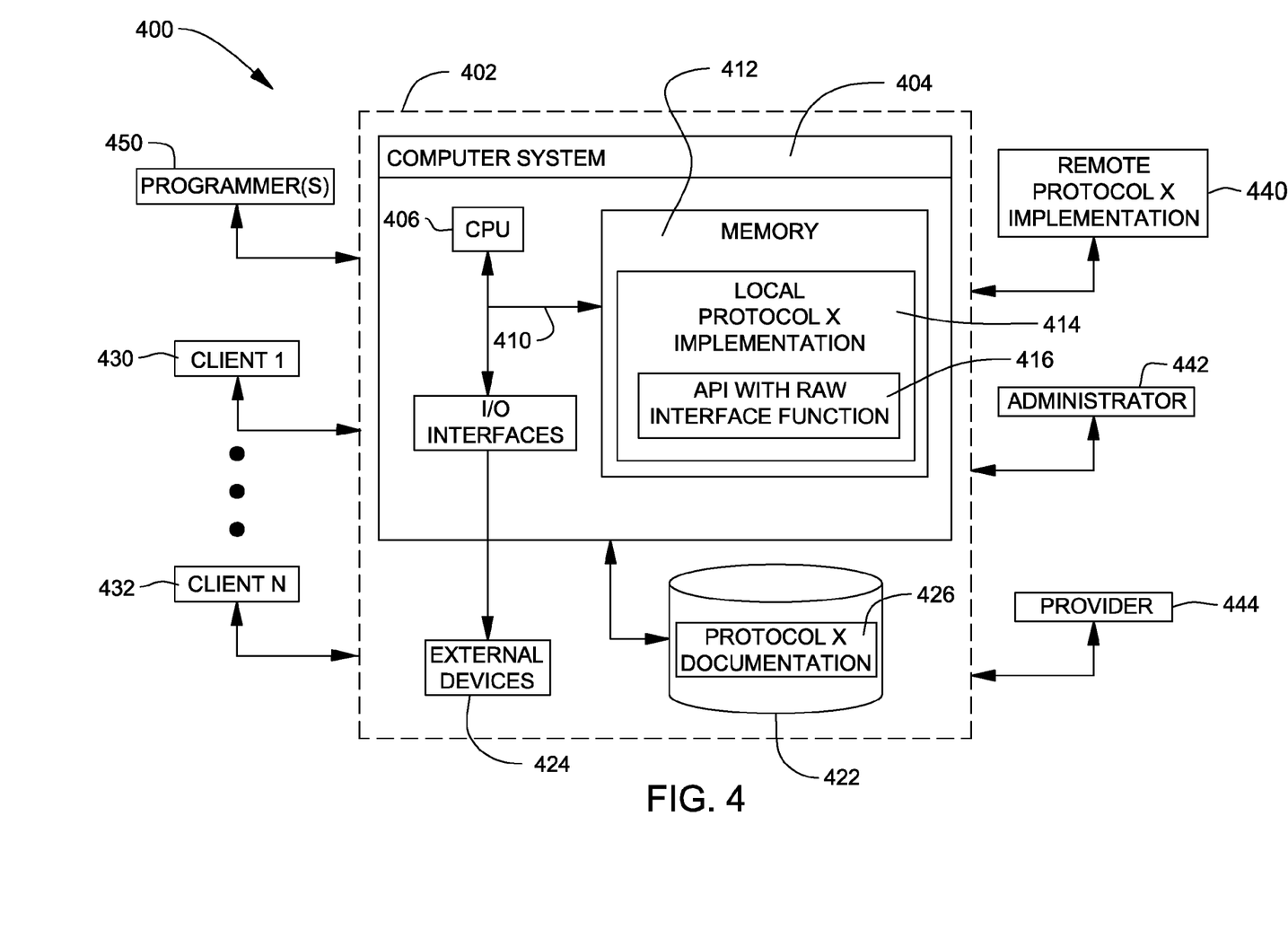
FIG. 4 is a schematic block system diagram illustrating an embodiment of a computer infrastructure for modifying functionality provided in an application programming interface (API) for a protocol X implementation, in accordance with an embodiment of the present invention.

Referring now to FIG. 4, there is illustrated a system 400 for modifying functionality provided in an application programming interface for a local protocol X implementation. As depicted, system 400 includes a computer infrastructure 402, which is intended to represent any type of computer architecture that is maintained in a secure environment (i.e., for which access control is enforced). As shown, infrastructure 402 includes a computer system 404 that typically represents a server or the like. It should be understood, however, that although not shown, other hardware and software components (e.g., additional computer systems, such as, application servers, administrative servers, routers, firewalls, etc.) could be included in infrastructure 402.

In general, a client, namely, a client or calling application (such as, client 1, reference numeral 430 through client N, reference numeral 432) may interface with infrastructure 402 for accessing functionality provided in an application programming interface (API) 416 for a local protocol X implementation 414 installed on computer system 404. In particular, the API 416 for the local protocol X implementation 414 provides a raw interface function for modifying or overriding existing functionality when a remote protocol X implementation 440 has been modified and/or upgraded. As such, a programmer or programmer(s) 450 for any of the clients 1 (reference numeral 430) to client N (432) may interface with infrastructure 402 for accessing and/or modifying the existing functionality provided in the API 416 for the local protocol X implementation 414, so that a client or client application may obtain services provided by another application that utilizes an API for the remote protocol X implementation 440, which may differ from the local protocol X implementation 414. Similarly, an administrator 442 can interface with infrastructure 402 for supporting and/or configuring the infrastructure 402, such as, upgrading the remote protocol X implementation 440 when adding functionality, etc. In general, the parties could access infrastructure 402 directly, or over a network via interfaces (e.g., client web browsers) loaded on computerized devices (e.g., personal computers, laptops, handheld devices, etc.). In the case of the latter, the network can be any type of network such as the Internet or can be any other network, such as, a local area network (LAN), a wide area network (WAN), a virtual private network (VPN), etc. In any event, communication with infrastructure 402 could occur via a direct hardwired connection (e.g., serial port), or via an addressable connection that may utilize any combination of wire line and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, the parties could utilize an Internet service provider to establish connectivity to infrastructure 402. It should be understood that under the present invention, infrastructure 402 could be owned and/or operated by a party, such as, a provider 444, or by an independent entity. Regardless, use of infrastructure 402 and the teachings described herein could be offered to the parties on a subscription or fee-basis. In either scenario, an administrator 436 could support and configure infrastructure 402, as mentioned herein above.

Computer system or server 404 is shown to include a CPU (hereinafter "processing unit 406"), a memory 412, a bus 410, and input/output (I/O) interfaces 408. Further, computer system 400 is shown in communication with external I/O devices/resources 424 and storage system 422. In an embodiment as shown, the storage system 422 includes protocol X documentation 426 for the API 416 with the raw interface function provided for the local protocol X implementation 414, so that a programmer or programmer(s) 450 can access the protocol X documentation, if needed, for modifying or overriding existing functionality. In general, processing unit 406 executes computer program codes, such as the API with the raw interface function 416 provided for the local protocol X implementation 414. While executing the API 416 for the protocol X implementation 414, the processing unit 406 can read and/or write data, to/from memory 412, storage system 422, and/or I/O interfaces 408. Bus 410 provides a communication link between each of the components in computer system 400. External devices 424 can include any devices (e.g., keyboard, pointing device, display, etc.) that enable a user to interact with computer system 400 and/or any devices (e.g., network card, modem, etc.) that enable computer system 400 to communicate with one or more other computing devices. Program instructions are stored in a functional form in a computer readable storage for execution by processing unit 406 via memory 412. In these illustrative examples, storage system 422 is an example of a non-transitory computer readable storage medium.

Computer infrastructure 402 is only illustrative of various types of computer infrastructures for implementing the invention. For example, in one embodiment, computer infrastructure 402 includes two or more computing devices (e.g., a server cluster) that communicate over a network to perform the various process steps of the invention. Moreover, computer system 400 is only representative of various possible computer systems that can include numerous combinations of hardware. To this extent, in other embodiments, computer system 400 can include any specific purpose computing article of manufacture comprising hardware and/or computer program code for performing specific functions, any computing article of manufacture that includes a combination of specific purpose and general purpose hardware/software, or the like. In each case, the program code and hardware can be created using standard programming and engineering techniques, respectively. Moreover, processing unit 406 may include a single processing unit, or be distributed across one or more processing units in one or more locations, e.g., on a client and server. Similarly, memory 412 and/or storage system 422 can include any combination of various types of data storage that reside at one or more physical locations. Further, I/O interfaces 408 can include any system for exchanging information with one or more external devices 424. Still further, it is understood that one or more additional components (e.g., system software, math co-processing unit, etc., not shown in FIG. 4) can be included in computer system 400. Similarly, it is understood that the one or more external devices 424 (e.g., a display) and/or storage system(s) 422 could be contained within computer system 404, and not externally as shown.

Storage system 422 can be any type of system (e.g., a database) capable of storing information or data, such as the protocol X documentation 426 that provide additional guidance for modifying or overriding existing functionality provided by the local protocol X implementation 414. To this extent, storage system 422 could include one or more storage devices, such as a magnetic disk drive or an optical disk drive. In another embodiment, storage system 422 includes data distributed across, for example, a local area network (LAN), wide area network (WAN) or a storage area network (SAN) (not shown). Although not shown, additional components, such as cache memory, communication systems, system software, etc., may be incorporated into computer system 400.

The foregoing descriptions of specific embodiments of the present invention have been presented for the purpose of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of overriding existing functionality provided in an application programming interface for a local protocol implementation, said method comprising the steps of:

receiving, by said application programming interface running on a processing unit in a computer, for an interface function an array of pre-formed payload elements for creating a customized protocol request message for requesting a protocol service from a server application using a remote protocol implementation, wherein said local protocol implementation implementing a protocol includes said application programming interface, wherein said application programming interface has said interface function that is invoked by a client application to override said existing functionality provided in said application programming interface to interoperate with said remote protocol implementation implementing said protocol, and wherein said remote protocol implementation supports different functionality than said local protocol implementation;

placing, by said application programming interface running on said processing unit in said computer, data for each element in said array of pre-formed payload elements defined for creating said customized protocol request message; and said interface function for said application programming interface running on said processing unit in said computer overriding said existing functionality, by inserting said array of pre-formed payload elements in said customized protocol request message, and sending said customized protocol request message to said remote protocol implementation.

2. The method according to claim 1, further comprising the steps of:

returning to said client application a protocol response message from said server application, said protocol response message containing payload data formatted as another array of pre-formed payload elements.

3. The method according to claim 2, wherein said application programming interface has one or more pre-defined protocol functions that can be invoked by said client application for sending a standard protocol request message requesting said protocol service.

4. The method according to claim 3 further comprising the step of:
invoking a pre-defined protocol function of said one or more pre-defined protocol functions, said pre-defined protocol function having a list of pre-defined parameters to be passed to said pre-defined protocol function invoked for creating said standard protocol request message.

5. The method according to claim 4, wherein said invoking said pre-defined protocol function step further comprises the step of:
loading data corresponding to said list of pre-defined parameters into pre-defined payload elements of said standard protocol request message, said pre-defined payload elements corresponding to said list of pre-defined parameters passed to said pre-defined protocol function.

6. The method according to claim 5, wherein said each element in said array of pre-formed payload elements created comprises at least one of: a TLV (Type, Length, Value), an AVP (Attribute Value Pair) and a delimited text string.

7. The method according to claim 6, wherein said protocol comprises any protocol that uses discrete payload elements.

8. The method according to claim 6, wherein said protocol comprises a Diameter protocol.

9. A computer system for modifying existing protocol functionality provided in an application programming interface for a client-side protocol implementation, said computer system comprising:
a processing unit, a computer readable storage media, and a memory; and
program instructions for said client-side protocol implementation implementing a protocol having said application programming interface, said application programming interface having an interface function that overrides said existing protocol functionality provided in said application programming interface, wherein a client application using said client-side protocol implementation defines for said interface function an array of pre-formed payload elements for creating a customized protocol request message for requesting a protocol service from a server-side application using a server-side remote protocol implementation implementing said protocol that provides said protocol service in response to receiving a protocol message, said server-side remote protocol implementation supporting different functionality than said client-side protocol implementation; wherein said client application places data for each element in said array of pre-formed payload elements; and wherein said client application invokes said interface function to modify said existing protocol functionality provided in said application programming interface of said client-side protocol implementation, wherein the program instructions are stored in a functional form in the computer readable storage for execution by the processing unit via the memory in the computer system.

10. The computer system according to claim 9, wherein said interface function further takes as input said array of pre-formed and pre-populated payload elements defined, creates said customized protocol request message by inserting said array of pre-formed payload elements after a protocol message header of said customized protocol request message, and sends said customized protocol request message to said server-side application using said server-side remote protocol implementation.

11. The computer system according to claim 10, wherein said client-side protocol implementation having said application programming interface receives a function call invoking a pre-defined protocol function provided in said application programming interface for sending a standard protocol request message to said server-side application requesting said protocol service; and wherein said server-side remote protocol implementation returns to said client application a protocol response message containing payload data formatted as another array of pre-formed payload elements.

12. The computer system according to claim 11, wherein said application programming interface loads data corresponding to a list of pre-defined parameters into pre-defined payload elements of said standard protocol request message, said pre-defined payload elements corresponding to said list of pre-defined parameters passed to said pre-defined protocol function.

13. The computer system according to claim 12, wherein said each element in said array of pre-formed payload elements created comprises at least one of: a TLV (Type, Length, Value), an AVP (Attribute Value Pair) and a delimited text string.

14. The computer system according to claim 13, wherein said protocol comprises any protocol that uses discrete payload elements.

15. A computer program product for modifying existing functionality provided in an application programming interface for a local protocol implementation, the computer program product comprising:
a computer readable tangible storage device;
first program instructions to provide said application programming interface for said local protocol implementation implementing a local protocol on a client, said application programming interface having an interface function that can be invoked by a client application to override said existing functionality provided in said application programming interface to interoperate with a remote protocol implementation implementing said local protocol on a server, said remote protocol implementation supporting different functionality than said local protocol implementation;
second program instructions to define for said interface function an array of pre-formed payload elements to be included for creating a customized protocol request message for requesting a protocol service from a server application using said remote protocol implementation, said second program instructions including instructions to populate data for each element in said array of pre-formed payload elements defined; and
third program instructions to invoke said interface function, wherein said interface function takes as input said array of pre-formed payload elements defined, creates said customized protocol request message by inserting said array of pre-formed payload elements in said customized protocol request message, and sends said customized protocol request message to said remote protocol implementation; and wherein said first, second, and third program instructions are stored on said computer readable tangible storage device.

16. The computer program product according to claim 15 further comprising:

fourth program instructions to return to said client application a protocol response message from said server application, said protocol response message containing payload data formatted as another array of pre-formed payload elements; wherein said fourth program instructions are stored on said computer readable tangible storage device.

17. The computer program product according to claim 16, wherein said first program instructions further comprise instructions to provide said application programming interface for said local protocol implementation having one or more pre-defined protocol functions that can be invoked by said client application for sending a standard protocol request message requesting said protocol service, and to invoke a pre-defined protocol function of said one or more pre-defined protocol functions provided, said pre-defined protocol function having a list of pre-defined parameters to be passed to said pre-defined protocol function invoked for creating said standard protocol request message.

18. The computer program product according to claim 17, wherein said first program instructions further comprise the instructions to load data corresponding to said list of pre-defined parameters into pre-defined payload elements of said standard protocol request message, said pre-defined payload elements corresponding to said list of pre-defined parameters passed to said pre-defined protocol function.

19. The computer program product according to claim 18, wherein said each element in said array of pre-formed payload elements created comprises at least one of: a TLV (Type, Length, Value), an AVP (Attribute Value Pair) and a delimited text string.

20. The computer program product according to claim 19, wherein said local protocol comprises any protocol that uses discrete payload elements.

* * * * *